US011933985B2

United States Patent
Fuchs et al.

(10) Patent No.: US 11,933,985 B2
(45) Date of Patent: Mar. 19, 2024

(54) METHOD FOR PRODUCING LIGHT-GUIDE OPTICAL ELEMENTS

(71) Applicant: Lumus Ltd., Ness Ziona (IL)

(72) Inventors: Ido Fuchs, Ness Ziona (IL); Edgar Friedmann, Sdey-Avraham (IL); Elad Sharlin, Mishmar David (IL); Kobi Greenstein, Ness Ziona (IL); Lilach Zuaretz, Ness Ziona (IL); Tsion Eisenffeld, Ashkelon (IL); Shimon Grabarnik, Rehovot (IL); Amir Shapira, Ness Ziona (IL); Dror Hermoni, Ness Ziona (IL)

(73) Assignee: LUMUS LTD., Ness Ziona (IL)

( * ) Notice: Subject to any disclaimer, the term of this patent is extended or adjusted under 35 U.S.C. 154(b) by 4 days.

(21) Appl. No.: 17/417,175

(22) PCT Filed: Feb. 2, 2021

(86) PCT No.: PCT/IL2021/050118
§ 371 (c)(1),
(2) Date: Jun. 22, 2021

(87) PCT Pub. No.: WO2021/152602
PCT Pub. Date: Aug. 5, 2021

(65) Prior Publication Data
US 2022/0357498 A1 Nov. 10, 2022

Related U.S. Application Data

(60) Provisional application No. 62/969,103, filed on Feb. 2, 2020.

(51) Int. Cl.
*G02B 27/01* (2006.01)
*F21V 8/00* (2006.01)

(52) U.S. Cl.
CPC ........ *G02B 27/0172* (2013.01); *G02B 6/0028* (2013.01); *G02B 6/0035* (2013.01);
(Continued)

(58) Field of Classification Search
CPC .................................................. G02B 27/0172
See application file for complete search history.

(56) References Cited

U.S. PATENT DOCUMENTS 6,580,529 B1 6/2003 Amital
6,671,100 B1 * 12/2003 McRuer ............ G02B 27/0081
359/630

(Continued)

FOREIGN PATENT DOCUMENTS

JP 2015121647 7/2015
WO 2018200913 11/2018

*Primary Examiner* — Michael Stahl
(74) *Attorney, Agent, or Firm* — Rivka Friedman

(57) ABSTRACT

A method for producing light-guide optical elements (LOEs) (16, 18, 56, 58) each having a set of mutually-parallel partially-reflecting surfaces (17) located between, and oriented non-parallel to, a pair of major external surfaces, and at least one region (30a, 30b, 30c) without partially-reflecting surfaces. The method includes bonding together parallel-faced plates (4) at interfaces to form a stack (42) of plates with partially-reflecting coatings between them. The stack is cut and polished to form a boundary plane (48, 48a, 48b) intersecting the interfaces, and a block (50, 50a, 50b) of transparent material is bonded to the stack. The resulting precursor structure (52, 52') is sliced along parallel planes to form slices, each containing a part of the stack for the active region of the LOE and a part of the block.

15 Claims, 14 Drawing Sheets

(52) U.S. Cl.
CPC .......... *G02B 6/0065* (2013.01); *G02B 6/0078* (2013.01); *G02B 2027/0123* (2013.01); *G02B 2027/0178* (2013.01)

(56) References Cited

U.S. PATENT DOCUMENTS

| | | |
|---|---|---|
| 8,432,614 B2 | 4/2013 | Amitai |
| 8,548,290 B2 | 10/2013 | Travers |
| 8,913,865 B1 | 12/2014 | Bennett |
| 9,791,703 B1 | 10/2017 | Vallius |
| 10,133,070 B2 | 11/2018 | Danziger |
| 10,962,787 B1 | 3/2021 | Lou |
| 11,667,004 B2 | 6/2023 | Maziel et al. |
| 2009/0003406 A1 | 1/2009 | Sjogren et al. |
| 2009/0034069 A1 | 2/2009 | Pre |
| 2015/0338655 A1 | 11/2015 | Sawada et al. |
| 2017/0045743 A1 | 2/2017 | Dobschal et al. |
| 2017/0363794 A1 | 12/2017 | Wan et al. |
| 2017/0363799 A1* | 12/2017 | Ofir .................... G02B 27/0172 |
| 2017/0371160 A1 | 12/2017 | Schultz |
| 2018/0246335 A1 | 8/2018 | Cheng et al. |
| 2018/0284448 A1 | 10/2018 | Matsuki |
| 2019/0293838 A1 | 9/2019 | Haba |
| 2020/0292733 A1 | 9/2020 | Lee |
| 2021/0033774 A1 | 2/2021 | Tanaka |

\* cited by examiner

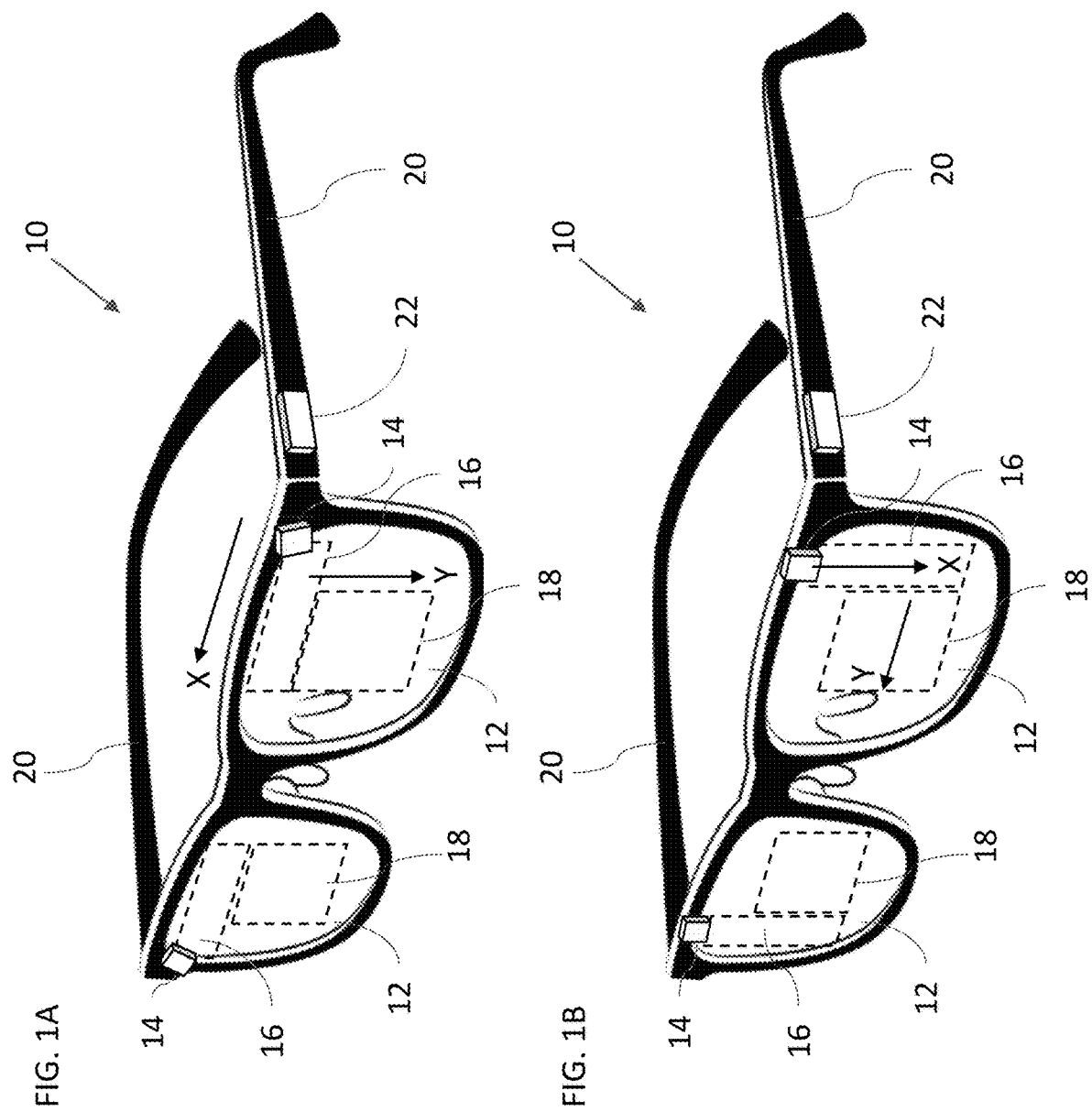

FIG. 5

32 — Bonding together a plurality of parallel-faced plates at a plurality of interfaces so as to form a stack of plates, one face at each of the interfaces having a coating to provide partially-reflecting optical properties 34 — Cutting and polishing the stack of plates to form a boundary plane intersecting at least one of the interfaces 36 — Bonding a block of transparent material to the stack at the boundary plane to form a precursor structure 38 — Slicing the precursor structure along a plurality of parallel planes so as to form a plurality of slices, each slice containing a part of the stack for providing the active region of the LOE and a part of the block to provide the secondary region of the LOE.

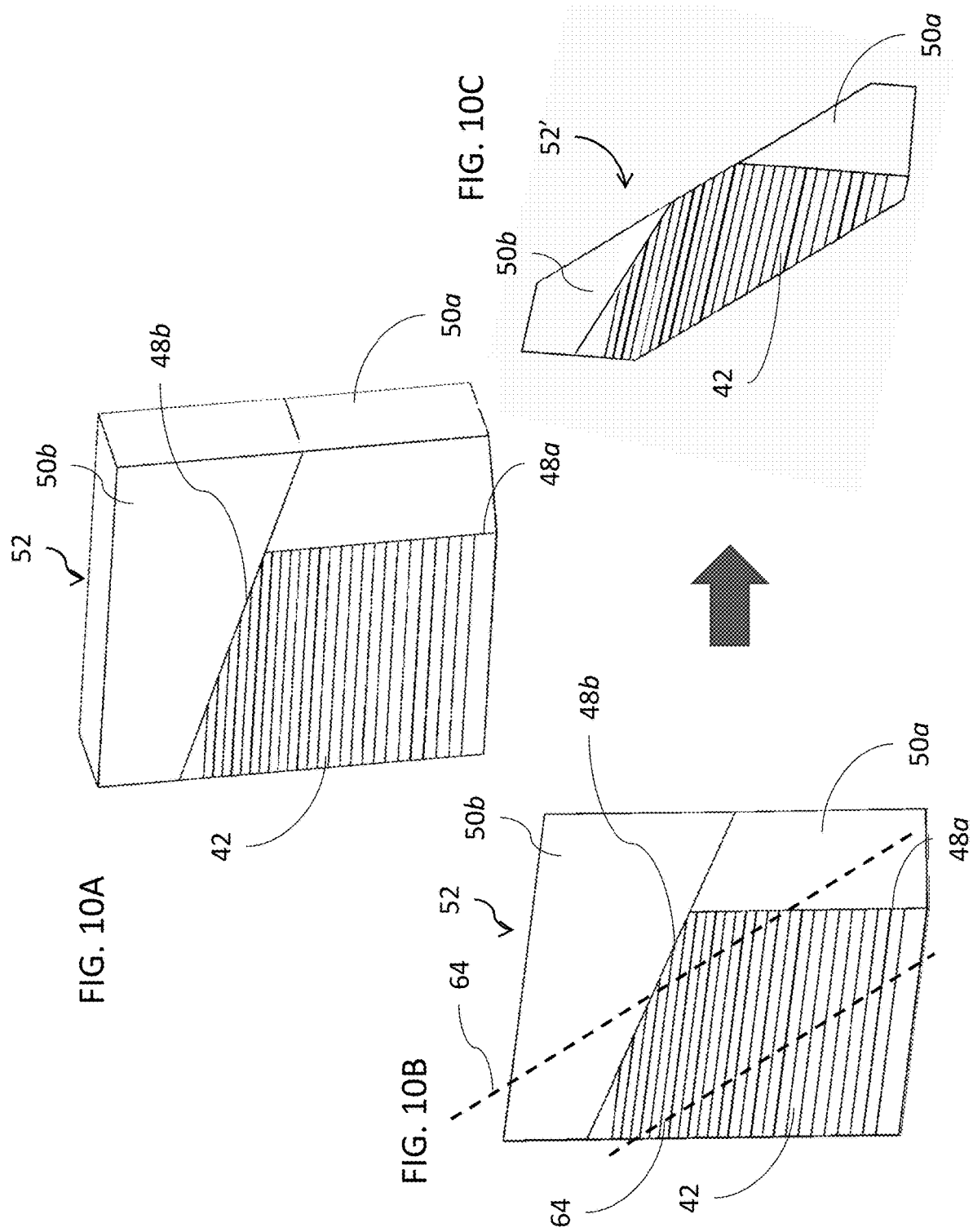

METHOD FOR PRODUCING LIGHT-GUIDE OPTICAL ELEMENTS

FIELD AND BACKGROUND OF THE INVENTION

The present invention relates to displays and, in particular, it concerns a method for producing light-guide optical elements.

Various types of display, such as near-eye displays, may employ a light-guide optical element (LOE) to expand an input image in one or more dimensions. Where two-dimensional expansion is required, two LOEs may be used, including a first LOE configured to expand an image in one dimension, and a second LOE configured to expand the image in the other dimension. Of particular relevance to the present invention are reflective LOE's, where at least one of the first and second LOEs is implemented as a transparent block bounded by two parallel major external surfaces configured to support propagation of light rays therebetween via total internal reflection (TIR) and having a set of mutually-parallel partially-reflecting internal surfaces (or "facets") located between, and non-parallel to, the major external surfaces. A collimated image propagating within the LOE is progressively partially deflected by facets of the first set of facets towards the second set of facets, and by the second set of facets outwards towards an eye of an observer, thereby presenting an image to the observer.

SUMMARY OF THE INVENTION

The present invention is a method for producing light-guide optical elements.

According to the teachings of an embodiment of the present invention there is provided, a method for producing light-guide optical elements (LOEs) each having a pair of mutually-parallel major external surfaces for guiding image illumination propagating within the LOE by internal reflection at the major external surfaces, each LOE further having an active region comprising a set of mutually-parallel partially-reflecting surfaces located between, and oriented non-parallel to, the major external surfaces, and at least one secondary region, at least one of the partially-reflecting surfaces terminating at a boundary between the active region and the secondary region, the method comprising the steps of: (a) bonding together a plurality of parallel-faced plates at a plurality of interfaces so as to form a stack of plates, one face at each of the interfaces having a coating to provide partially-reflecting optical properties; (b) cutting and polishing the stack of plates to form a boundary plane intersecting at least one of the interfaces; (c) bonding a block of transparent material to the stack at the boundary plane to form a precursor structure; and (d) slicing the precursor structure along a plurality of parallel planes so as to form a plurality of slices, each slice containing a part of the stack for providing the active region of the LOE and a part of the block to provide the secondary region of the LOE.

According to a further feature of an embodiment of the present invention, the boundary plane is cut along a plane obliquely oriented relative to a plane of the interfaces.

According to a further feature of an embodiment of the present invention, the block of transparent material is index-matched to the plurality of plates.

According to a further feature of an embodiment of the present invention, the block of transparent material is a block of optically continuous material.

According to a further feature of an embodiment of the present invention, the block of transparent material is a continuous uniform block.

According to a further feature of an embodiment of the present invention, prior to the slicing, the precursor structure is cut along at least one edge plane, a part of the edge plane defining, after the slicing, an edge of each LOE.

According to a further feature of an embodiment of the present invention, the plurality of parallel planes are perpendicular to the interfaces.

According to a further feature of an embodiment of the present invention, the plurality of parallel planes are obliquely angled relative to the interfaces.

According to a further feature of an embodiment of the present invention, an edge is formed to the active region of the LOE, wherein the boundary is non-parallel to the edge so that a length of the partially-reflecting surfaces in a direction parallel to the major external surfaces progressively decreases from partially-reflecting surface to partially-reflecting surface along at least a quarter of the set of partially-reflecting surfaces.

According to a further feature of an embodiment of the present invention, the coatings are configured to provide sequentially varying reflectivity for successive of the interfaces.

According to a further feature of an embodiment of the present invention, the plates have thicknesses differing from each other such that the interfaces are non-uniformly spaced.

According to a further feature of an embodiment of the present invention, the method further comprises the steps of: (a) cutting and polishing the stack of plates to form an additional boundary plane intersecting at least one of the interfaces, the additional boundary plane being non-coplanar with the boundary plane; and (b) bonding an additional block of transparent material to the stack at the boundary plane to form the precursor structure, and wherein the slicing is performed so that each slice additionally contains a part of the additional block.

There is also provided according to the teachings of an embodiment of the present invention, an intermediate work product sliceable along a plurality of parallel planes to form a plurality of light-guide optical elements (LOEs) each having a pair of mutually-parallel major external surfaces for guiding image illumination propagating within the LOE by internal reflection at the major external surfaces, each LOE further having an active region comprising a set of mutually-parallel partially-reflecting surfaces located between, and oriented non-parallel to, the major external surfaces, and at least one secondary region, at least one of the partially-reflecting surfaces terminating at a boundary between the active region and the secondary region, the intermediate work product comprising: (a) a stack formed from a plurality of parallel-faced plates bonded together at a plurality of interfaces, one face at each of the interfaces having a coating to provide partially-reflecting optical properties, the stack being cut and polished at a boundary plane intersecting at least one of the interfaces; and (b) a block of transparent material bonded to the stack at the boundary plane.

According to a further feature of an embodiment of the present invention, the boundary plane is obliquely oriented relative to a plane of the interfaces.

According to a further feature of an embodiment of the present invention, the block of transparent material is index-matched to the plurality of plates.

According to a further feature of an embodiment of the present invention, the block of transparent material is a block of optically continuous material.

According to a further feature of an embodiment of the present invention, the block of transparent material is a continuous uniform block.

According to a further feature of an embodiment of the present invention, the coatings are configured to provide sequentially varying reflectivity for successive of the interfaces.

According to a further feature of an embodiment of the present invention, the plates have thicknesses differing from each other such that the interfaces are non-uniformly spaced.

BRIEF DESCRIPTION OF THE DRAWINGS

The invention is herein described, by way of example only, with reference to the accompanying drawings, wherein:

FIGS. 1A and 1B are schematic isometric views of an optical system implemented using a light-guide optical element (LOE), constructed and operative according to the teachings of the present invention, illustrating a top-down and a side-injection configuration, respectively;

FIG. 5 is a flow diagram of a modified production method for multiple LOEs having a region from which partially-reflecting surfaces are excluded;

FIG. 10A is a schematic isometric view of an alternative precursor structure generated according to an aspect of the method of the present invention;

FIG. 10B is a side view of the precursor structure of FIG. 10A illustrating sectioning planes along which the precursor structure is cut to generate a modified precursor structure;

FIGS. 10C and 10D are side and isometric views, respectively, of the modified precursor structure after cutting along the sectioning planes of FIG. 10B.

DESCRIPTION OF THE PREFERRED EMBODIMENTS

Figure 2A:
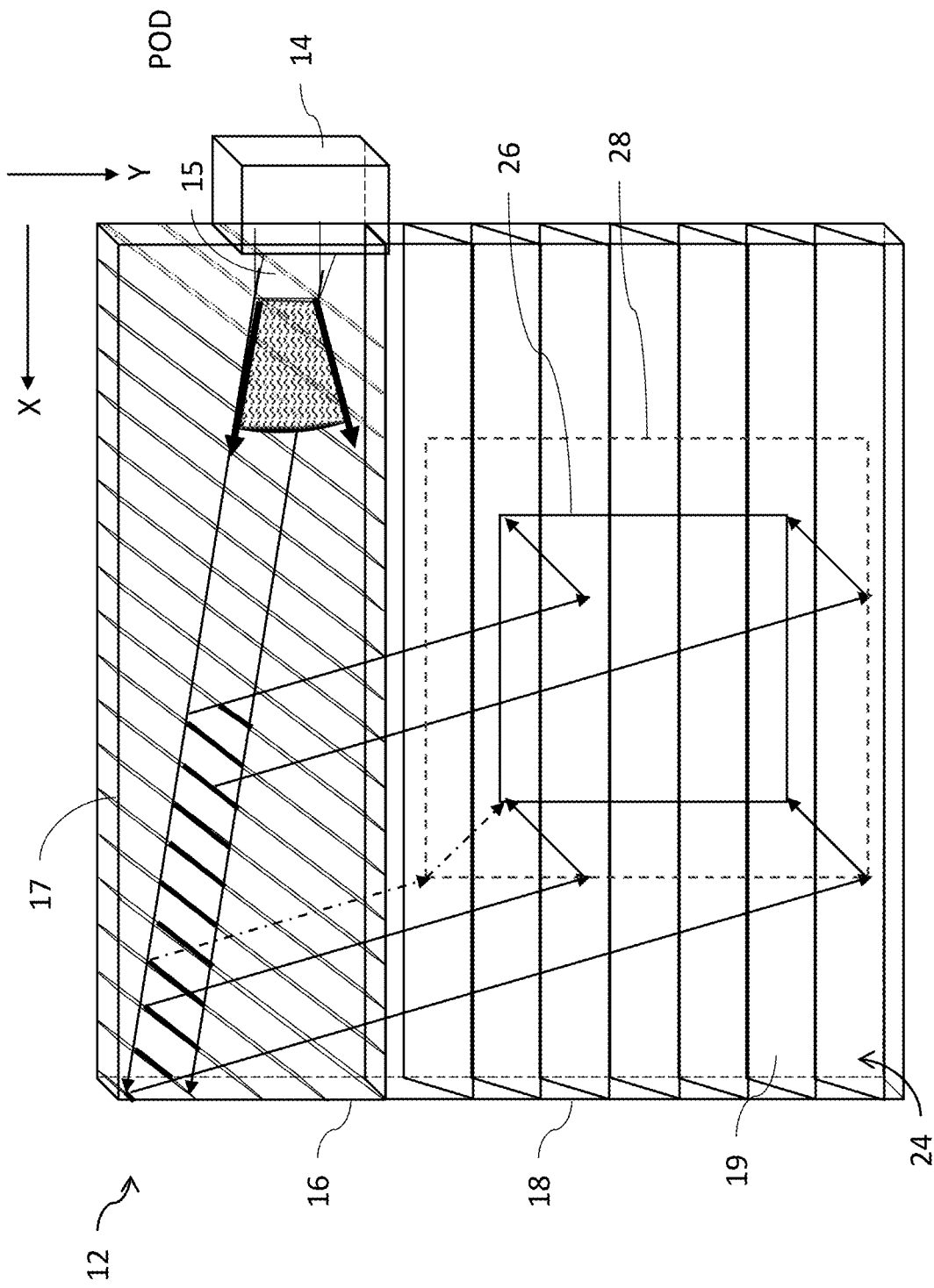
FIGS. 2A and 2B are enlarged schematic isometric views of an LOE from FIG. 1A or 1B showing ray paths for two extreme fields of an image.

Certain embodiments of the present invention provide a method for manufacturing a light-guide optical element (LOE) for achieving optical aperture expansion for the purpose of a head-up display, and most preferably a near-eye display, which may be a virtual reality display, or more preferably an augmented reality display. FIGS. 1A-3 illustrate certain particularly preferred examples of optical arrangements and corresponding devices for which the production methods of the present invention are particularly relevant, although the production methods are not limited to such applications.

An exemplary implementation of a device in the form of a near-eye display, generally designated 10, employing an LOE 12 according to the teachings of an embodiment of the present invention, is illustrated schematically in FIGS. 1A and 1B. The near-eye display 10 employs a compact image projector (often referred to in this field as a "POD") 14 optically coupled so as to inject an image into LOE (interchangeably referred to as a "waveguide," a "substrate" or a "slab") 12 within which the image light is trapped in one dimension by internal reflection at a set of mutually-parallel planar external surfaces. The light impinges of a set of partially-reflecting surfaces (interchangeably referred to as "facets") that are parallel to each other, and inclined obliquely to the direction of propagation of the image light, with each successive facet deflecting a proportion of the image light into a deflected direction, also trapped/guided by internal reflection within the substrate. This first set of facets are not illustrated individually in FIGS. 1A and 1B, but are located in a first region of the LOE designated 16. This partial reflection at successive facets achieves a first dimension of optical aperture expansion.

In a first set of preferred but non-limiting examples of the present invention, the aforementioned set of facets are orthogonal to the major external surfaces of the substrate. In this case, both the injected image and its conjugate undergoing internal reflection as it propagates within region 16 are deflected and become conjugate images propagating in a deflected direction. In an alternative set of preferred but non-limiting examples, the first set of partially-reflecting surfaces are obliquely angled relative to the major external surfaces of the LOE. In the latter case, either the injected image or its conjugate forms the desired deflected image propagating within the LOE, while the other reflection may be minimized, for example, by employing angularly-selective coatings on the facets which render them relatively transparent to the range of incident angles presented by the image whose reflection is not needed.

The first set of partially-reflecting surfaces deflect the image illumination from a first direction of propagation trapped by total internal reflection (TIR) within the substrate to a second direction of propagation, also trapped by TIR within the substrate.

The deflected image illumination then passes into a second substrate region 18, which may be implemented as an adjacent distinct substrate or as a continuation of a single substrate, in which a coupling-out arrangement (either a further set of partially reflective facets or a diffractive optical element) progressively couples out a proportion of the image illumination towards the eye of an observer located within a region defined as the eye-motion box (EMB), thereby achieving a second dimension of optical aperture expansion. The overall device may be implemented separately for each eye, and is preferably supported relative to the head of a user with the each LOE 12 facing a corresponding eye of the user. In one particularly preferred option as illustrated here, a support arrangement is implemented as an eye glasses frame with sides 20 for supporting the device relative to ears of the user. Other forms of support arrangement may also be used, including but not limited to, head bands, visors or devices suspended from helmets.

Reference is made herein in the drawings and claims to an X axis which extends horizontally (FIG. 1A) or vertically (FIG. 1B), in the general extensional direction of the first region of the LOE, and a Y axis which extends perpendicular thereto, i.e., vertically in FIG. 1A and horizontally in FIG. 1B.

In very approximate terms, the first LOE, or first region 16 of LOE 12, may be considered to achieve aperture expansion in the X direction while the second LOE, or second region 18 of LOE 12, achieves aperture expansion in the Y direction. The details of the spread of angular directions in which different parts of the field of view propagate will be addressed more precisely below. It should be noted that the orientation as illustrated in FIG. 1A may be regarded as a "top-down" implementation, where the image illumination entering the main (second region) of the LOE enters from the top edge, whereas the orientation illustrated in FIG. 1B may be regarded as a "side-injection" implementation, where the axis referred to here as the Y axis is deployed horizontally. In the remaining drawings, the various features of certain embodiments of the present invention will be illustrated in the context of a "top-down" orientation, similar to FIG. 1A. However, it should be appreciated that all of those features are equally applicable to side-injection implementations, which also fall within the scope of the invention. In certain cases, other intermediate orientations are also applicable, and are included within the scope of the present invention except where explicitly excluded.

The POD employed with the devices of the present invention is preferably configured to generate a collimated image, i.e., in which the light of each image pixel is a parallel beam, collimated to infinity, with an angular direction corresponding to the pixel position. The image illumination thus spans a range of angles corresponding to an angular field of view in two dimensions.

Image projector 14 includes at least one light source, typically deployed to illuminate a spatial light modulator, such as an LCOS chip. The spatial light modulator modulates the projected intensity of each pixel of the image, thereby generating an image. Alternatively, the image projector may include a scanning arrangement, typically implemented using a fast-scanning mirror, which scans illumination from a laser light source across an image plane of the projector while the intensity of the beam is varied synchronously with the motion on a pixel-by-pixel basis, thereby projecting a desired intensity for each pixel. In both cases, collimating optics are provided to generate an output projected image which is collimated to infinity Some or all of the above components are typically arranged on surfaces of one or more polarizing beam-splitter (PBS) cube or other prism arrangement, as is well known in the art.

Optical coupling of image projector 14 to LOE 12 may be achieved by any suitable optical coupling, such as for example via a coupling prism with an obliquely angled input surface, or via a reflective coupling arrangement, via a side edge and/or one of the major external surfaces of the LOE. Details of the coupling-in configuration are not critical to the invention, and are shown here schematically as a non-limiting example of a wedge prism 15 applied to one of the major external surfaces of the LOE.

It will be appreciated that the near-eye display 10 includes various additional components, typically including a controller 22 for actuating the image projector 14, typically employing electrical power from a small onboard battery (not shown) or some other suitable power source. It will be appreciated that controller 22 includes all necessary electronic components such as at least one processor or processing circuitry to drive the image projector, all as is known in the art.

Turning now to FIGS. 2A-2F, the optical properties of an implementation of the near-eye display are illustrated in more detail. Specifically, there is shown a more detailed view of a light-guide optical element (LOE) 12 formed from transparent material, including a first region 16 containing a first set of planar, mutually-parallel, partially-reflecting surfaces 17 having a first orientation, and a second region 18 containing a second set of planar, mutually-parallel, partially-reflecting surfaces 19 having a second orientation non-parallel to the first orientation. A set of mutually-parallel major external surfaces 24 extend across the first and second regions 16 and 18 such that both the first set of partially-reflecting surfaces 17 and the second set of partially-reflecting surfaces 19 are located between the major external surfaces 24. Most preferably, the set of major external surfaces 24 are a pair of surfaces which are each continuous across the entirety of first and second regions 16 and 18, although the option of having a set down or a step up in thickness between the regions 16 and 18 also falls within the scope of the present invention. Regions 16 and 18 may be immediately juxtaposed so that they meet at a boundary, which may be a straight boundary or some other form of boundary, or there may be one or more additional LOE region interposed between those regions, to provide various additional optical or mechanical function, depending upon the particular application. In certain particularly preferred implementations, particularly high quality major external surfaces are achieved by employing continuous external plates between which the separately formed regions 16 and 18 are sandwiched to form the compound LOE structure.

The optical properties of the LOE may be understood by tracing the image illumination paths backwards. The second set of partially-reflecting surfaces 19 are at an oblique angle to the major external surfaces 24 so that a part of image illumination propagating within the LOE 12 by internal reflection at the major external surfaces from the first region 16 into the second region 18 is coupled out of the LOE towards an eye-motion box 26. The first set of partially-reflecting surfaces 17 are oriented so that a part of image illumination propagating within the LOE 12 by internal reflection at the major external surfaces from the coupling-in region (coupling prism 15) is deflected towards the second region 18.

One dimension of the angular spread of the projected image from image projector 14 is represented in FIG. 2A by the cone of illumination spreading from the POD aperture on the right side of the LOE towards the left side of the LOE. In the non-limiting example illustrated here, the central optical axis of the POD defines a direction of propagation within the LOE aligned with the X axis, and the angular spread (within the LOE) is roughly ±16°. (It should be noted that the angular FOV becomes larger in air due to the change in refractive index.) The first set of partially-reflecting surfaces 17 are illustrated in first region 16, and the second set of partially-reflecting surfaces 19 are illustrated in second region 18.

The near-eye display is designed to provide a full field-of-view of the projected image to an eye of the user that is located at some position within the permitted range of positions designated by an "eye-motion box" (EMB) 26 (that is, a shape, typically represented as a rectangle, spaced away from the plane of the LOE from which the pupil of the eye will view the projected image). In order to reach the eye-motion box, light must be coupled-out from the second region 18 by the second set of partially-reflecting surfaces 19 towards the EMB 26. In order to provide the full image field-of-view, each point in the EMB must receive the entire angular range of the image from the LOE. Tracing back the field-of-view from the EMB indicates a larger rectangle 28 from which relevant illumination is coupled-out of the LOE towards the EMB.

FIG. 2A illustrates a first extremity of the field of view, corresponding to the bottom-left pixel of the projected image. A beam of a width corresponding to the optical aperture of the projector as coupled into the LOE is shown propagating leftwards and upwards from the POD and being partially reflected from a series of partially-reflecting surfaces 17. As illustrated here, only a subset of the facets generate reflections that are useful for providing the corresponding pixel in the image viewed by the user, and only a sub-region of those facets contributes to the observed image of this pixel. The relevant regions are illustrated by heavy black lines, and the rays corresponding to this pixel in the redirected image reflected from facets 17 and then coupled-out by facets 19 reaching the four corners of the EMB 26 are shown. Here and throughout the description, it will be noted that only the in-plane propagation directions of the rays are illustrated here during propagation within the LOE, but the rays actually follow a zigzag path of repeated internal reflection from the two major external surfaces, and one entire dimension of the image field of view is encoded by the angle of inclination of the rays relative to the major external surfaces, corresponding to the pixel position in the Y dimension. By way of one additional example, deflected and coupled-out rays corresponding to the top-left extremity of the image as viewed at the top-left corner of the EMB are shown in dash-dot lines.

Figure 2B:
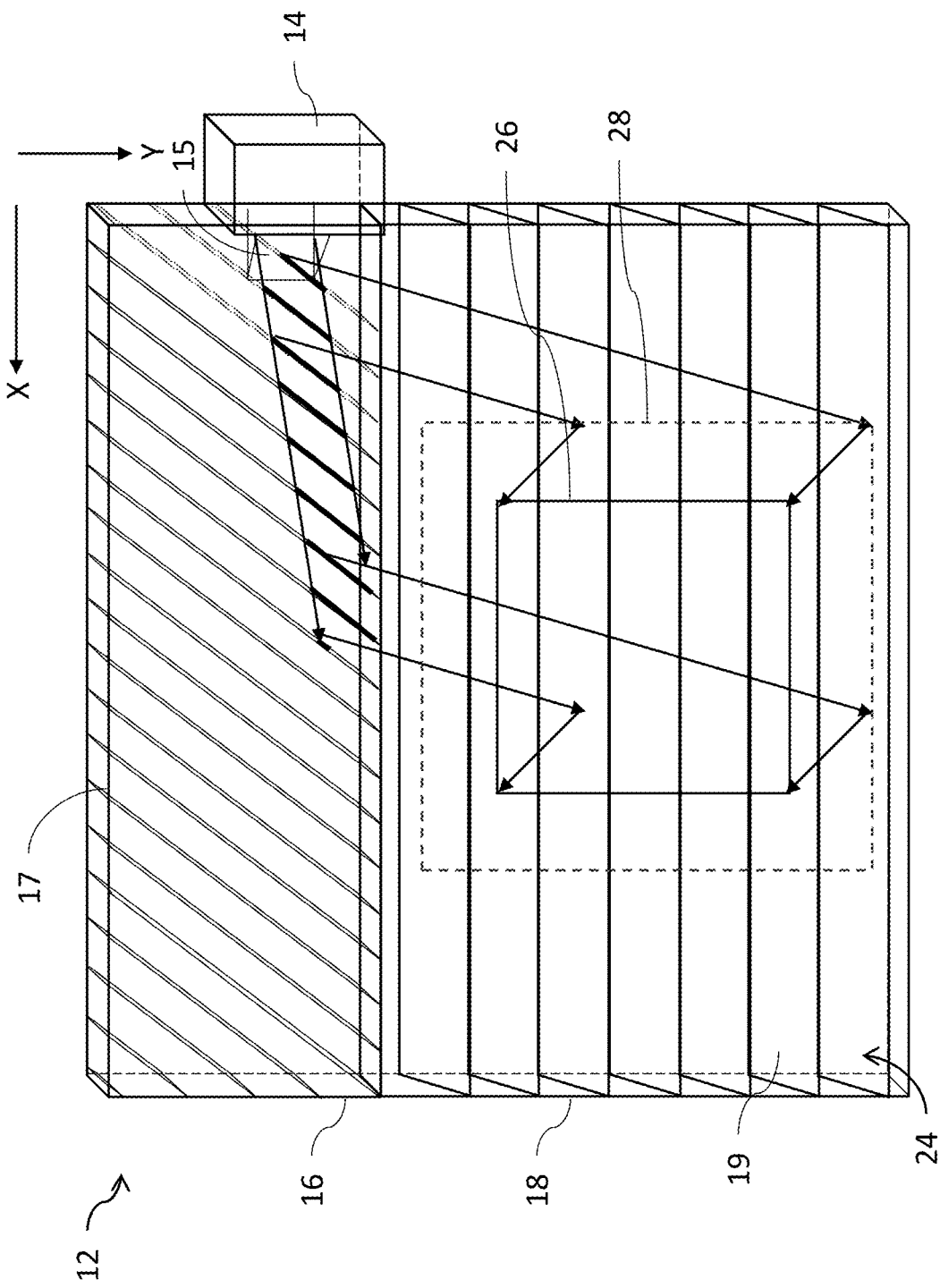

FIG. 2B illustrates the same configuration as FIG. 2A, but here shows the rays corresponding to the bottom-right pixel of the field-of-view reaching the four corners of the EMB, again with the relevant regions of the relevant partially-reflecting surfaces 17 denoted by a heavy line.

It will be apparent that, by additionally tracing correspond ray paths for all fields (directions or pixels) of the image reaching all regions of the EMB, it is possible to map out an envelope of all ray paths from the coupling-in region propagating within the LOE, deflected by one of the first set of partially-reflecting surfaces and coupled out by one of the second set of partially-reflecting surfaces in a direction reaching the eye-motion box, and this envelope defines an "imaging area" of each facet 17 which is needed for deflecting part of the image illumination which contributes to the image reaching the EMB, while the remainder of the facet 17 lying outside the envelope is a "non-imaging area" which does not contribute to the required image. A simplified outline of this envelope corresponding to the "imaging areas" of all of the facets 17 is shown in heavy lines in FIG. 2C.

It has been found that the parts of the facets in the "non-imaging area" may in certain cases have an adverse effect on image quality, for example, supporting unintended multiple-reflection light paths with give rise to ghost images of the input image illumination and/or external radiation from ambient light sources. In order to minimize such effects, according to certain particularly preferred implementations of the present invention, it is preferable to implement facets 17 as "partial facets" such that the partially-reflecting properties are only present within a subregion of the cross-sectional area of region 16 which includes the "imaging area" of each facet plane, and preferably excludes at least the majority of the "non-imaging area" for some or all of the facets. Such an implementation is illustrated schematically in FIG. 2D. The active (partially-reflecting) area of the facets preferably extends slightly beyond the minimum required to complete the geometrical requirements for the EMB image projection. According to certain particularly preferred implementations, the distance of the furthest partially-reflecting facet encountered along a line from the coupling-in location progressively increases with increasing angle clockwise as shown, away from the boundary with the second region 18 over a majority of the angular range of the image projected from projector 14. This leaves one or more regions, labeled here as 30a, 30b and 30c, which are within region 16 and are preferably implemented without partially reflecting facets.

In FIGS. 2A-2D, the optical axis of the projector 14 is illustrated as being parallel to the X-axis. It should be appreciated that the optical axis is not actually parallel to the X axis but rather lies in the X-Z plane, with a Z-component into the page chosen such that the entire range of angles in the depth dimension of the FOV undergo total internal reflection at the major substrate surfaces. For simplicity of presentation, the graphic representations herein, and the description thereof, will relate only to the in-plane (X-Y) component of the light ray propagation directions, referred to herein as the "in-plane component" or the "component parallel to the major external surfaces of the LOE."

Figure 3:
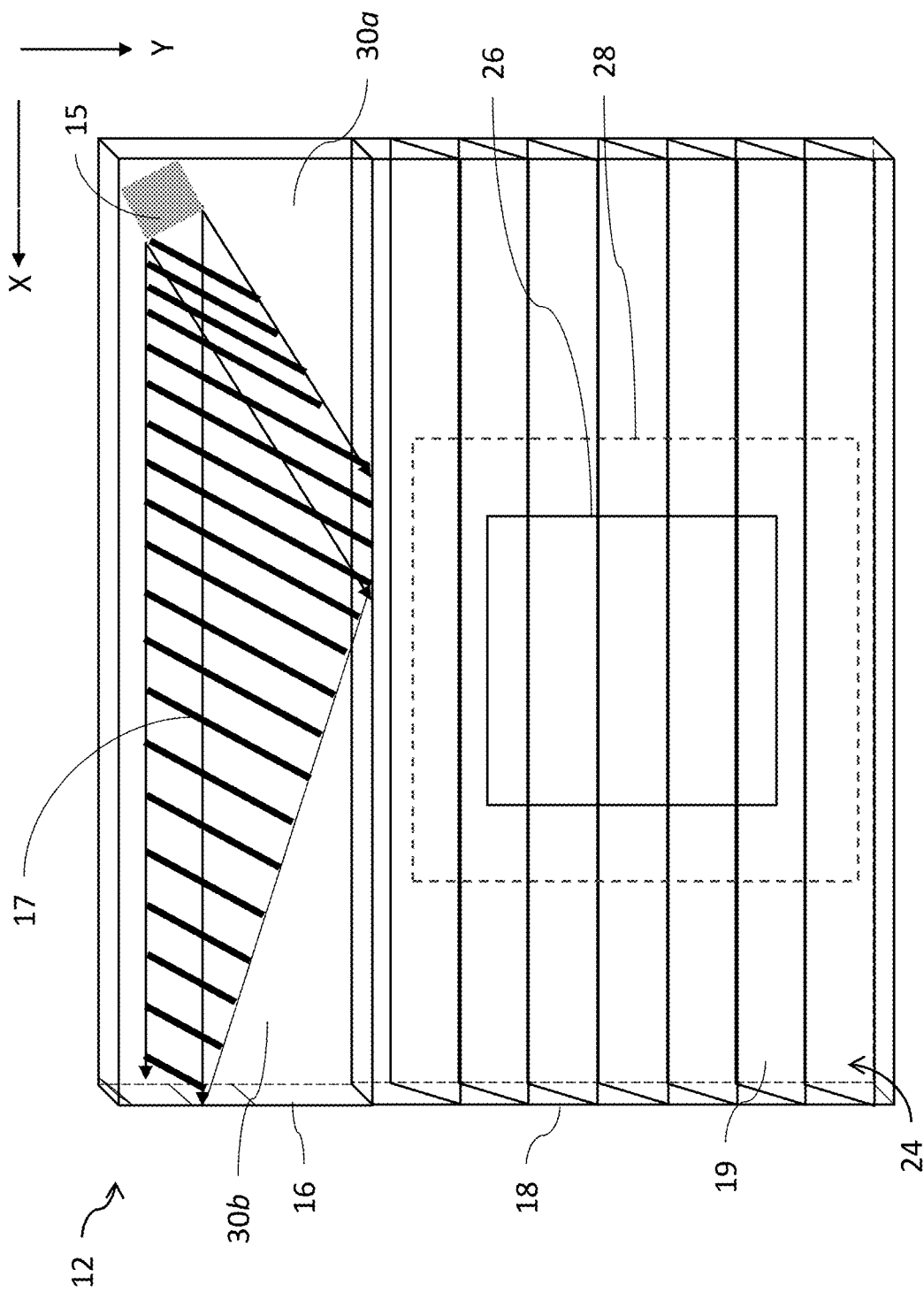
FIG. 3 is an enlarged schematic isometric view of an alternative implementation of an LOE similar to that of FIG. 2D in which an image projector is employed at a different position and with a different optical axis orientation.

FIG. 3 illustrates a similar implementation in which the optical axis of the projector is rotated so as to align one side of the field with the upper edge of the region 16. In this case, there are two regions, labeled 30a and 30b which are preferably implemented without partially-reflective facets.

Figure 2C:
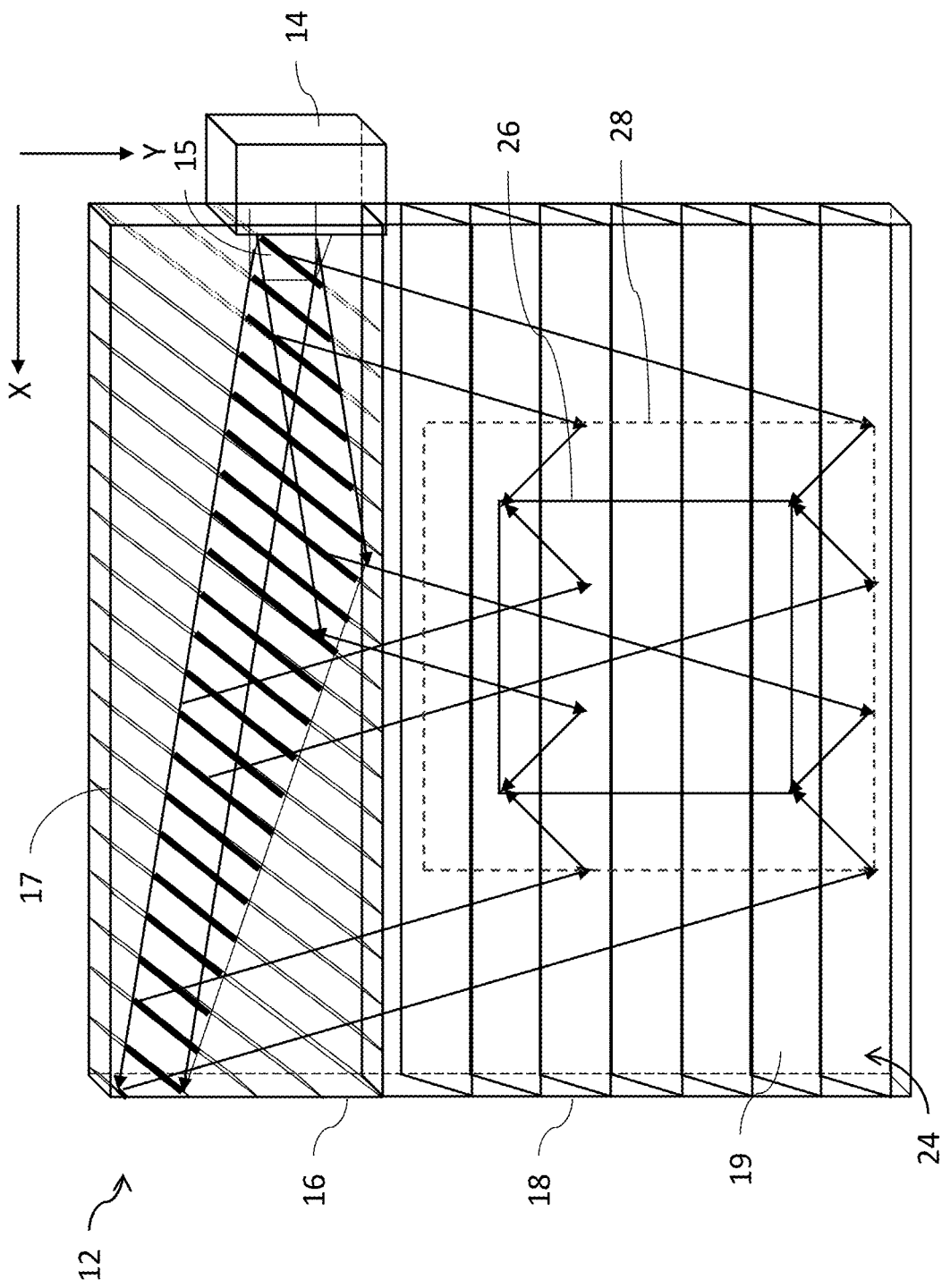
FIG. 2C is an overview of the combination of the fields of FIGS. 1A and 1B with additional fields to define an overall envelope of partially-reflecting surfaces that are needed to form a full image at an eye-motion box.
Figure 4:
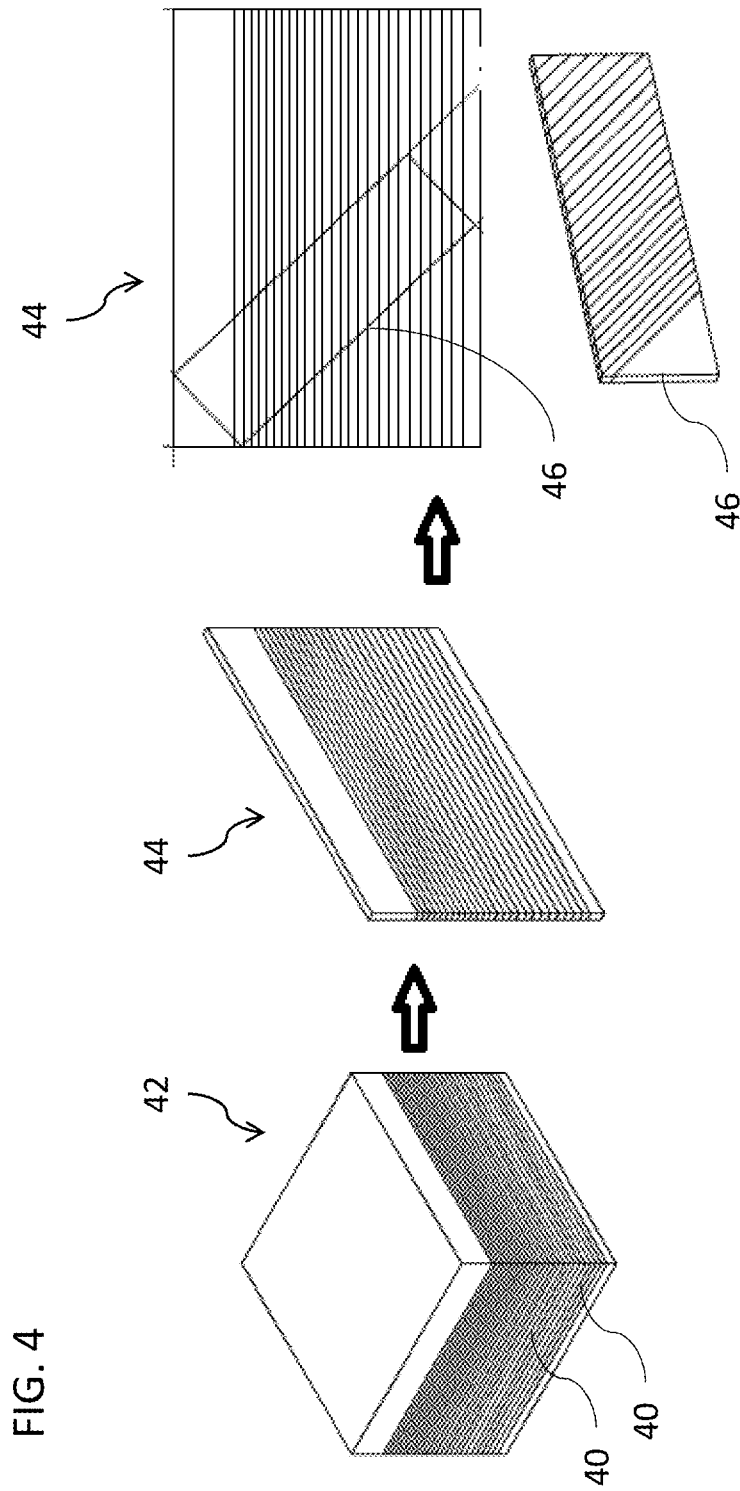
FIG. 4 is a schematic isometric representation of stages of a production method for multiple LOEs by slicing a stack of plates.

FIG. 4 illustrates a typical production method for manufacturing an LOE region 16 or 18 such as is illustrated in FIGS. 2A-2C. The method involves first stacking and bonding a plurality of transparent plates 40 optically coated with an at least partially reflective coating, thereby forming a stack 42. The interfaces between plates correspond to the facets of the LOE. The stack is typically topped off (at the top and/or bottom) with a transparent plate having a thickness of several times that of the other plates. The stack is cut into slices 44 at the desired angle relative to the facet surfaces. Each slice is then shaped (e.g., by cutting and/or grinding, followed by polishing) to form parallel external surfaces with the facets oriented at a specific predetermined angle relative to the external surfaces based on the required LOE configuration 46. In other words, the LOE is shaped out of a slice from a stack of parallel coated glass plates, where the angle and orientation of the partially reflecting surfaces is determined by the slicing angle and the orientation of the subsequent cutting.

The above manufacturing process is efficient, in that a single stack of plates can be used to manufacture a plurality of similar LOEs through the slicing, cutting and polishing steps mentioned above. The use of thick end plates for the stack allows production of a region of clear glass before the first facet and/or after the last facet, but only at a boundary parallel to the facets. This approach cannot, however, directly form inactive regions such as regions 30a, 30b and 30c of FIGS. 2D and 3, since these regions intersect multiple stacked and bonded transparent plates that form faceted region 17.

Figure 2D:
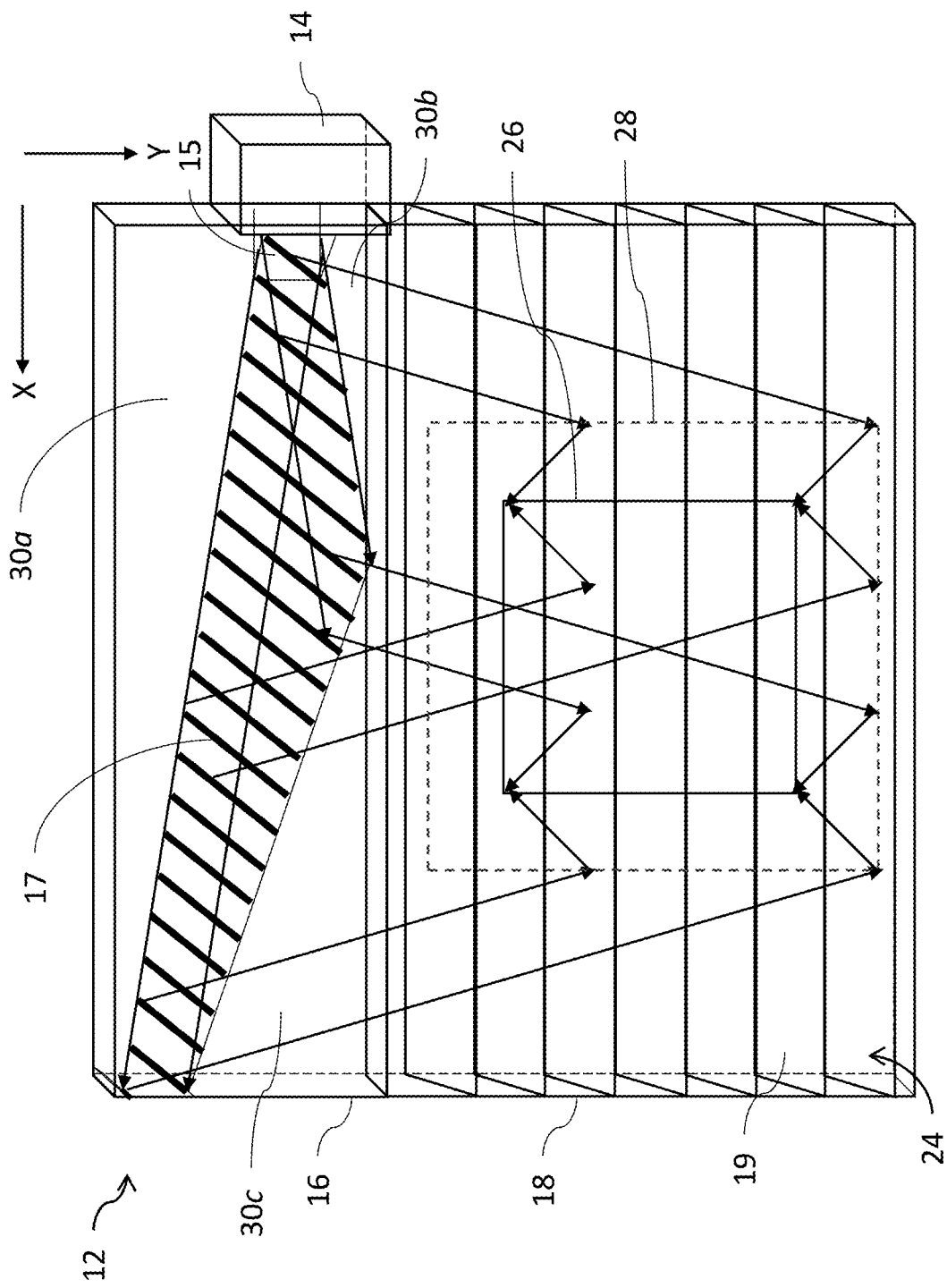
FIG. 2D is an alternative implementation of FIG. 2C in which the partially-reflecting surfaces are implemented selectively.

Thus, in order to produce the waveguide described in FIG. 2D or 3, or other similar waveguides with partial facets, additional steps are needed beyond the manufacturing method described above with reference to FIG. 4.

According to one particularly preferred aspect of the present invention, there is provided a method for producing light-guide optical elements (LOEs), where each LOE has a pair of mutually-parallel major external surfaces for guiding image illumination propagating within the LOE by internal reflection at the major external surfaces, an active region having a set of mutually-parallel partially-reflecting surfaces located between, and oriented non-parallel to, the major external surfaces, and at least one secondary region, where at least one of the partially-reflecting surfaces terminates at a boundary between the active region and the secondary region. The method includes at least the following steps, as illustrated in the block diagram of FIG. 5, and schematically in FIG. 6:

(a) bonding together a plurality of parallel-faced plates 40 at a plurality of interfaces so as to form a stack 42 of plates, one face at each of the interfaces having a coating to provide partially-reflecting optical properties (step 32);
  (b) cutting and polishing the stack of plates to form a boundary plane 48 intersecting at least one of the interfaces (step 34);
  (c) bonding a block 50 of transparent material to stack 42 at the boundary plane 48 to form a precursor structure 52 (step 36); and
  (d) slicing the precursor structure 52 along a plurality of parallel planes so as to form a plurality of slices 54, each slice containing a part of the stack 42 for providing the active region of the LOE and a part of the block 50 to provide the secondary region of the LOE.

Figure 6:
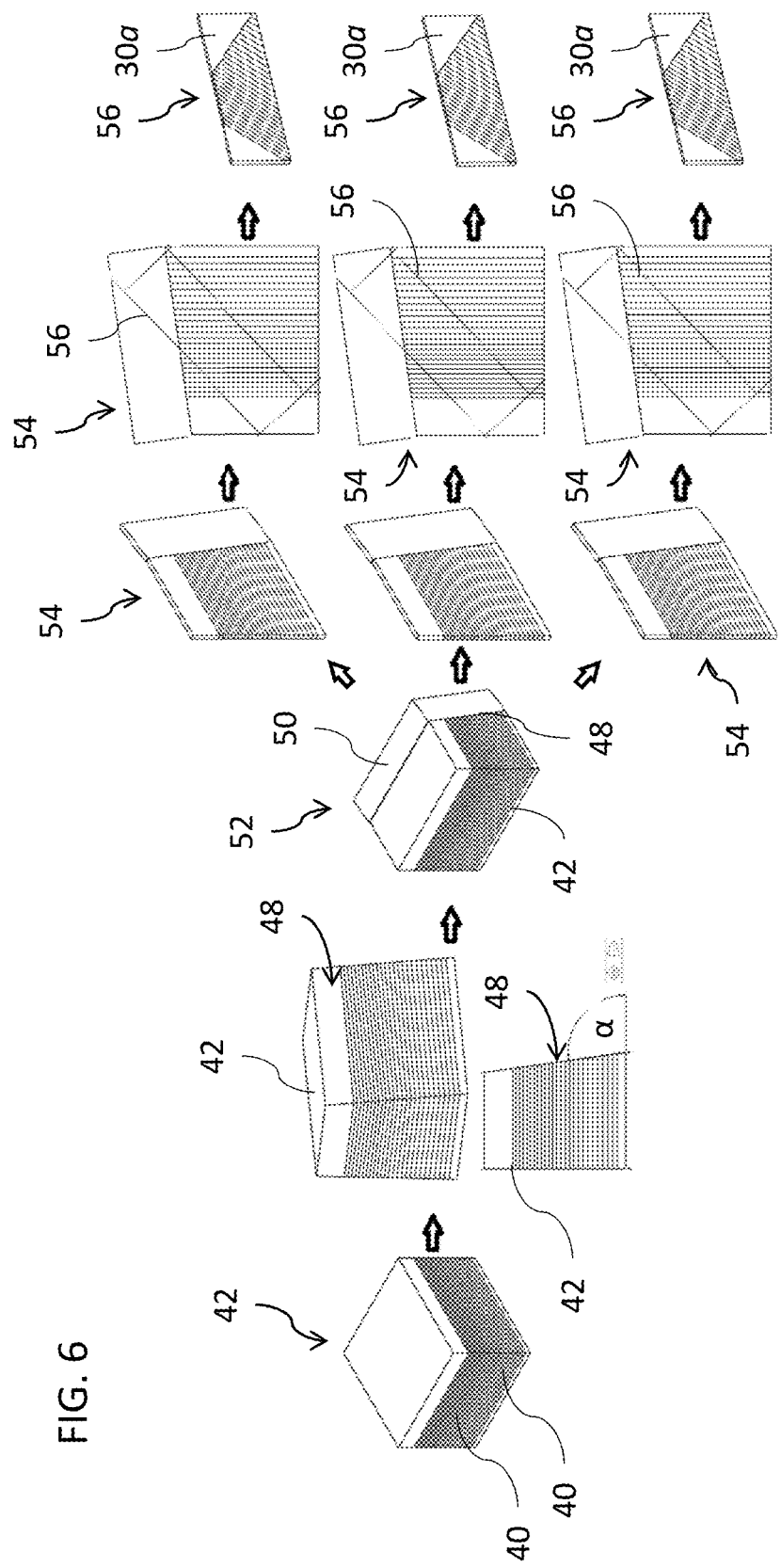
FIG. 6 is a schematic isometric representation of stages of a production method for multiple LOEs by slicing a stack of plates according to the modified production method of FIG. 5.

In the example illustrated in FIG. 6, the final LOE 56 is cut out from each slice 54 as shown, thereby forming an LOE 56 with at least one region 30a from which this set of facets is excluded.

Preferably, block 50 is formed from a transparent material index-matched to the plurality of plates, so that the boundary between the region with facets and the region without facets does not generate significant optical aberration. For the same reason, it may be preferable for attachment of block 50 to stack 42 to be performed with index-matched optical adhesive. Block 50 itself is preferably a block of optically continuous material, meaning that it does not have internal features which cause noticeable optical aberrations, scattering or deflection of light. Most preferably, block 50 is implemented as a continuous uniform block of transparent material, typically glass.

The orientation and position of boundary plane 48 is chosen according to the location of the desired boundary in the final LOE structure. In most cases, the orientation will be a plane obliquely oriented relative to a plane of the interfaces. This is illustrated schematically as angle α (greater than 90°) in FIG. 6.

Figure 7A:
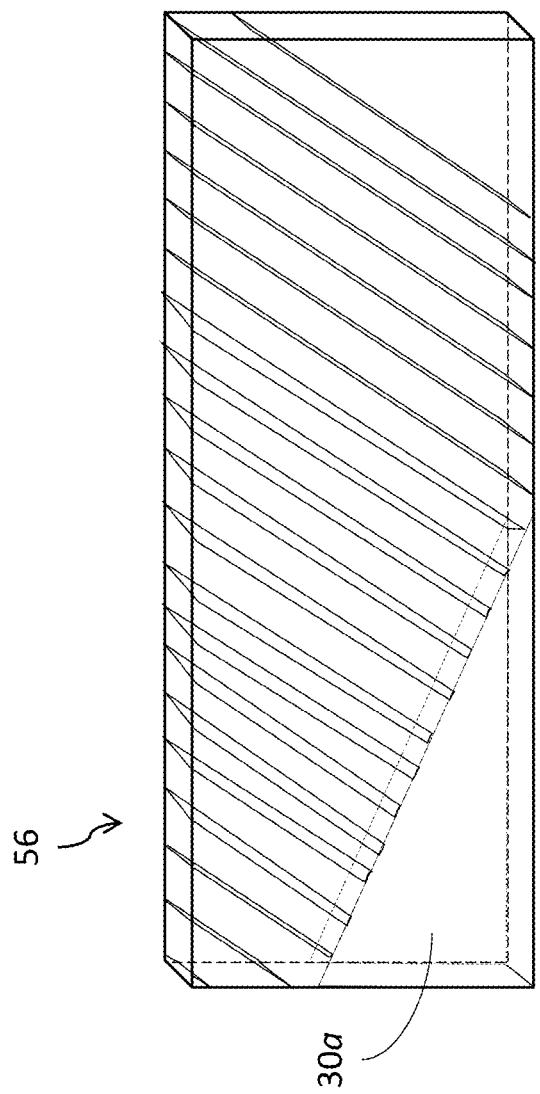
FIGS. 7A and 7B are enlarged schematic isometric views of two LOEs produced by the method of FIGS. 5 and 6, with one and two regions without partially-reflecting surfaces, respectively.
Figure 7B:
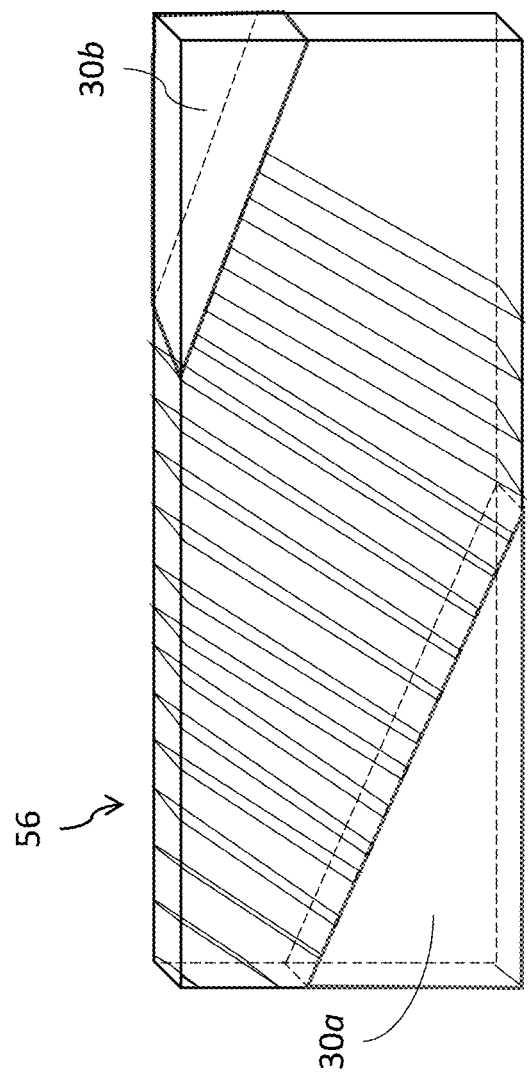
Figure 8:
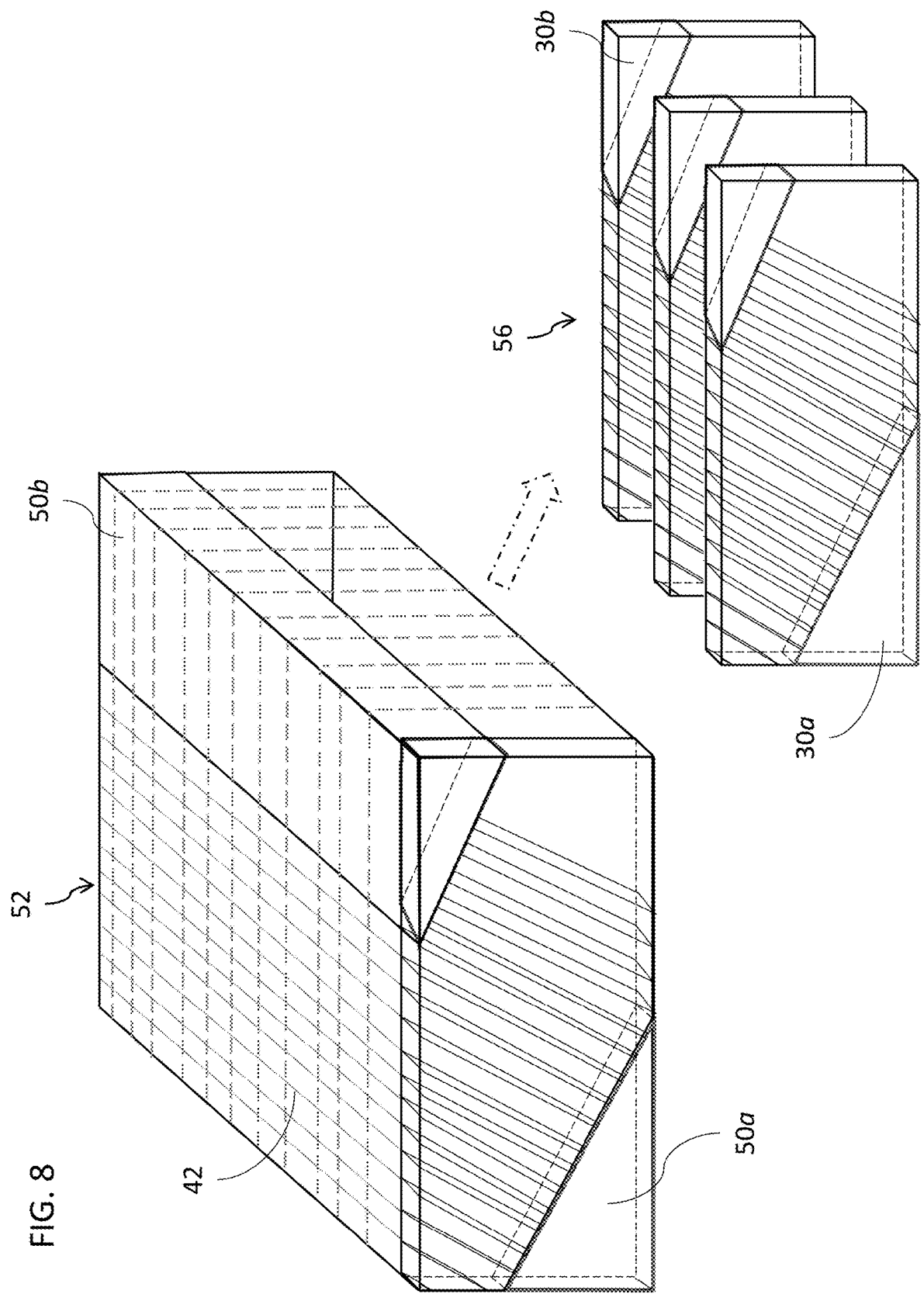
FIG. 8 is a schematic isometric representation of a precursor structure from which the LOEs of FIG. 7B are sliced.

The method of FIGS. 5 and 6 sets out the steps for manufacturing LOEs with a single inactive region 30a, as illustrated in FIG. 7A, but is readily adapted by repetition of steps 34 and 36 to form additional boundary planes and to add additional transparent blocks to the precursor structure prior to slicing for forming two or more inactive regions from which the set of facets are excluded. FIG. 7B illustrates a further example of an LOE 56 having two inactive regions 30a and 30b, and FIG. 8 illustrates a number of such LOEs 56 being sliced from a corresponding precursor structure 52 so that each slide includes a region of the stack and a region of both blocks.

Figure 9:
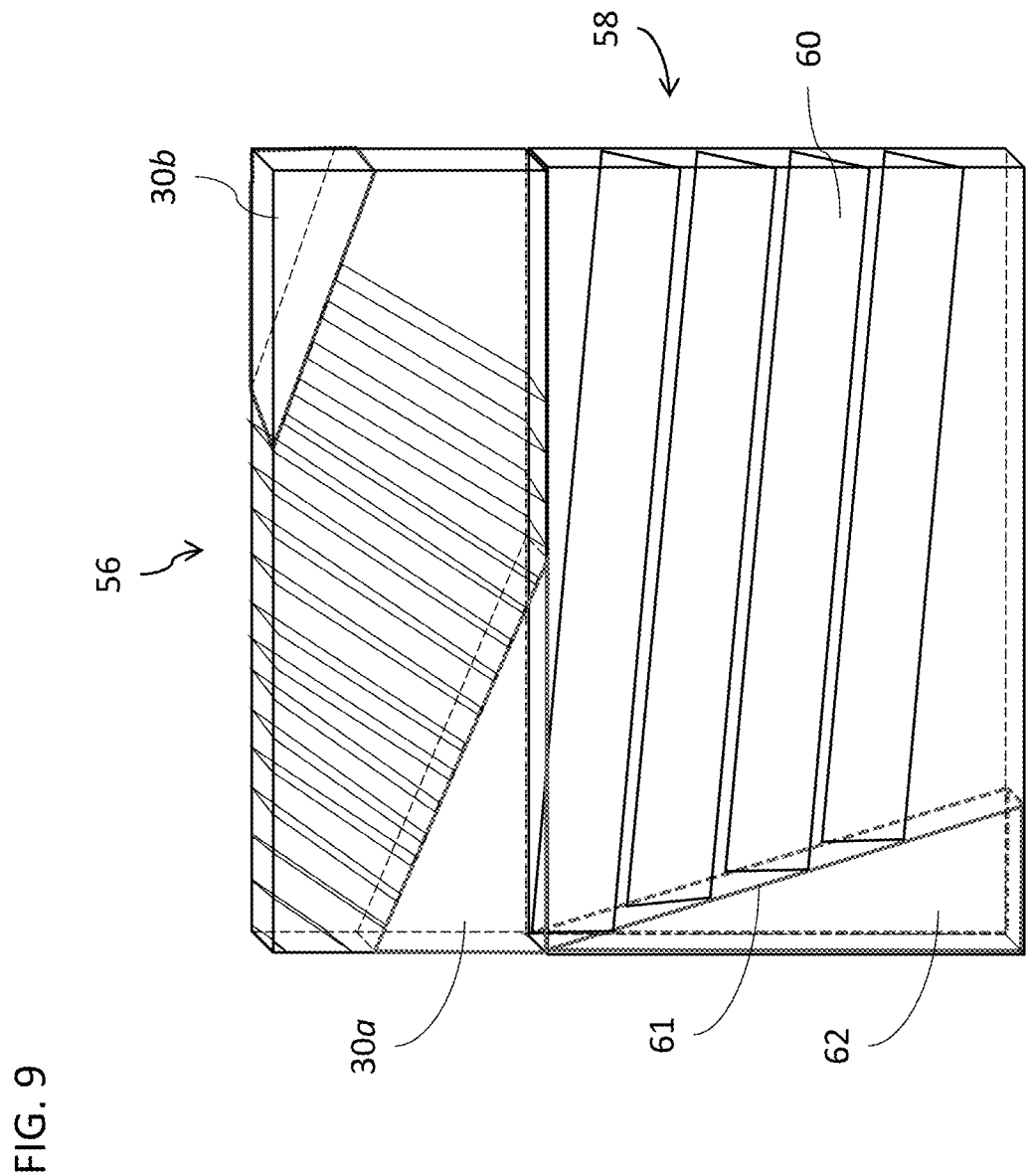
FIG. 9 is a schematic isometric view of a two-dimensional expansion LOE having a first LOE region corresponding to the LOE of FIG. 7B and a second LOE region also implemented with a region without partially-reflecting surfaces.

Although illustrated herein primarily in the example of a first dimension of expansion of an optical aperture, where the facets are responsible for a deflection from a first guided direction to a second guided direction of image light propagation with the LOE, the same principles are applicable to an LOE employed for a second (or any other) stage of optical aperture expansion. By way of example, FIG. 9 illustrates an optical arrangement including a first LOE 56 as illustrated in FIG. 7B for performing a first dimension of optical aperture expansion and a second LOE 58 for implementing a second dimension of optical aperture expansion and coupling-out the image illumination towards the eye of the observer. In this case, coupling-out facets 60 (shown schematically excessively spaced apart in order to facilitate understanding of the illustration) are limited to an active region of LOE 58, and are excluded from an inactive region 62 in which the facets are not needed for directing any part of the image to any part of the EMB. The facets stop at a boundary plane 61. Here too, the inactive region 62 is preferably generated together with the rest of the LOE by slicing a precursor assembly (not shown) including a transparent block bonded to a stack of coated plates, all as disclosed above with reference to FIGS. 5 and 6.

Figure 10E:
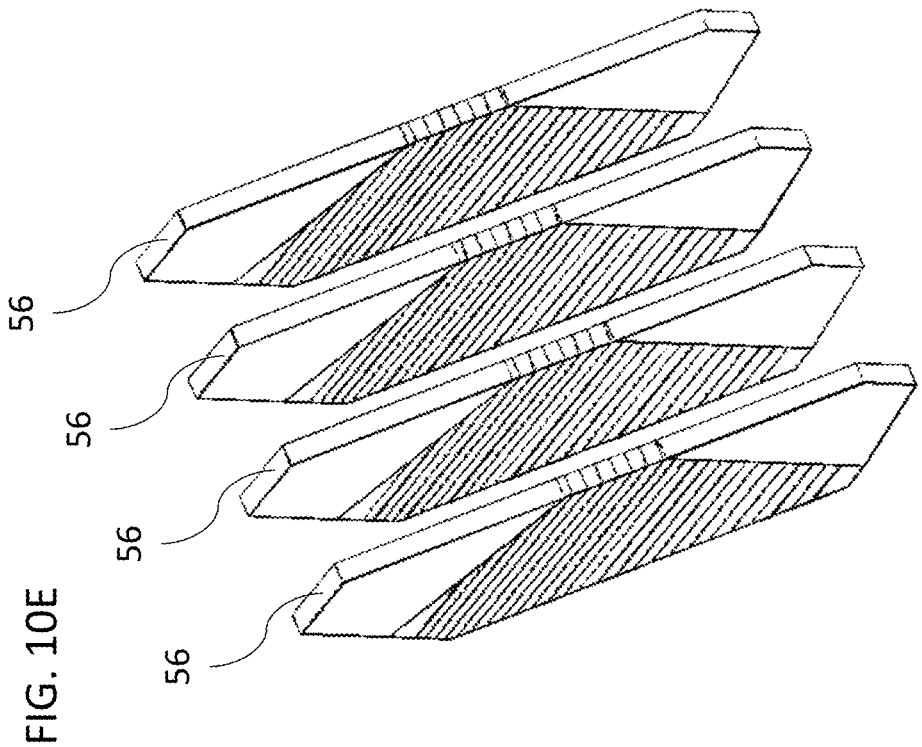
FIG. 10E shows a number of LOEs obtained by slicing the precursor structure of FIG. 10D.
Figure 10D:
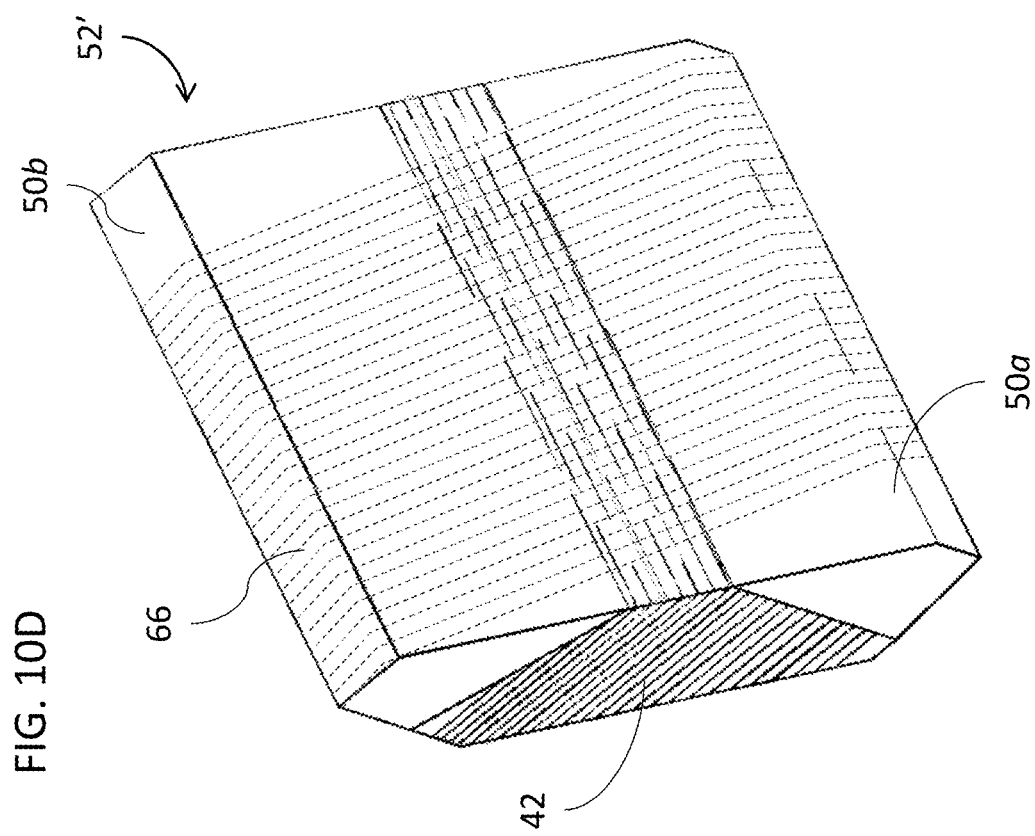

FIGS. 10A-10E illustrate a further example of the method of the present invention generally similar to the previous examples. In this case, the precursor structure 52 (FIG. 10A) is formed by attachment to stack 42 of a first block 50a at a first boundary plane 48a, and a second block 50b at a second boundary plane 48b. In this case, the cutting of second boundary plane 48b also includes cutting of part of the first block 50a. FIG. 10B is a side view illustrating cutting lines 64 along which the precursor structure is preferably cut prior to slicing. This cutting preferably defines one or more edge planes, parts of which define, after slicing, an edge of each LOE. The resulting pre-shaped precursor structure 52' is shown in FIGS. 10C and 10D. Subsequent slicing of precursor structure 52' along the slicing planes (dashed lines 66 of FIG. 10D) results in near-final LOE structures 58, typically requiring only final polishing and any other steps required for assembling the LOE as part of the overall optical design.

It will be noted that the production methods of the present invention are applicable to a wide range of LOE structures for different applications, and can be adapted to provide different parameters of the LOE. For example, in certain implementations, the parallel slicing planes are oriented perpendicular to the interfaces of the stack, resulting in partially-reflecting surfaces that are orthogonal to the major external surfaces of the LOE. For other applications, the parallel slicing planes are obliquely angled relative to the interfaces, thereby generating an LOE with partially-reflecting surfaces that are oblique to the major external surfaces of the LOE.

The method of the present invention may also be implemented with sequences of partially-reflecting surfaces that implement various additional features, all according to the requirements of a particular optical arrangement. Examples include, but are not limited to, variable facet spacing, where the plates have thicknesses differing from each other such that the interfaces are non-uniformly spaced, and varying reflectivity, where the coatings are configured to provide sequentially varying reflectivity for successive of the interfaces.

Clearly, depending upon the desired geometry of the final optical device, the inactive region of the LOE may extend along a larger or smaller proportion of the region of facets. According to certain particularly preferred implementations, the boundary plane is non-parallel to an edge of the LOE so that a length of the partially-reflecting surfaces in a direction parallel to the major external surfaces progressively decreases from partially-reflecting surface to partially-reflecting surface along at least a quarter of the set of partially-reflecting surfaces.

As mentioned above in the context of FIG. 1B, the two-dimensional optical expansion examples illustrated herein in a "top-down" context can all equally be applied to "sideway" configurations, where an image is injected from a POD located laterally outside the viewing area and is spread by a first set of facets vertically and then by a second set of facets horizontally for coupling into the eye of the user. All of the above-described configurations and variants should be understood to be applicable also in a side-injection configuration.

Throughout the above description, reference has been made to the X axis and the Y axis as shown, where the X axis is either horizontal or vertical, and corresponds to the first dimension of the optical aperture expansion, and the Y axis is the other major axis corresponding to the second dimension of expansion. In this context, X and Y can be defined relative to the orientation of the device when mounted on the head of a user, in an orientation which is typically defined by a support arrangement, such as the aforementioned glasses frame of FIGS. 1A and 1B. Other terms which typically coincide with that definition of the X axis include: (a) at least one straight line delimiting the eye-motion box, that can be used to define a direction parallel to the X axis; (b) the edges of a rectangular projected image are typically parallel to the X axis and the Y axis; and (c) a boundary between the first region 16 and the second region 18 typically extends parallel to the X axis.

It will be appreciated that the above descriptions are intended only to serve as examples, and that many other embodiments are possible within the scope of the present invention as defined in the appended claims.

What is claimed is:

1. A method for producing light-guide optical elements (LOEs) each having a pair of mutually-parallel major external surfaces for guiding image illumination propagating within the LOE by internal reflection at the major external surfaces, each LOE further having an active region comprising a set of mutually-parallel partially-reflecting surfaces located between, and oriented non-parallel to, the major external surfaces, and at least one secondary region, at least one of said partially-reflecting surfaces terminating at a boundary between the active region and the secondary region, the method comprising the steps of:
   (a) bonding together a plurality of parallel-faced plates at a plurality of interfaces so as to form a stack of plates, one face at each of said interfaces having a coating to provide partially-reflecting optical properties;
   (b) cutting and polishing said stack of plates to form a boundary plane intersecting at least one of said interfaces;
   (c) bonding a block of transparent material to said stack at said boundary plane to form a precursor structure; and
   (d) slicing said precursor structure along a plurality of parallel planes so as to form a plurality of slices, each slice containing a part of said stack for providing the active region of the LOE and a part of said block to provide the secondary region of the LOE.

2. The method of claim 1, wherein said boundary plane is cut along a plane obliquely oriented relative to a plane of said interfaces.

3. The method of claim 1, wherein said block of transparent material is index-matched to said plurality of plates.

4. The method of claim 1, wherein said block of transparent material is a block of optically continuous material.

5. The method of claim 1, wherein said block of transparent material is a continuous uniform block.

6. The method of claim 1, further comprising, prior to said slicing, cutting said precursor structure along at least one edge plane, a part of said edge plane defining, after said slicing, an edge of each LOE.

7. The method of claim 1, wherein said plurality of parallel planes are perpendicular to said interfaces.

8. The method of claim 1, wherein said plurality of parallel planes are obliquely angled relative to said interfaces.

9. The method of claim 1, further comprising forming an edge to the active region of the LOE, wherein said boundary is non-parallel to the edge so that a length of said partially-reflecting surfaces in a direction parallel to said major external surfaces progressively decreases from partially-reflecting surface to partially-reflecting surface along at least a quarter of the set of partially-reflecting surfaces.

10. The method of claim 1, wherein said coatings are configured to provide sequentially varying reflectivity for successive of said interfaces.

11. The method of claim 1, wherein said plates have thicknesses differing from each other such that said interfaces are non-uniformly spaced.

12. The method of claim 1, further comprising the steps of:
   (a) cutting and polishing said stack of plates to form an additional boundary plane intersecting at least one of said interfaces, said additional boundary plane being non-coplanar with said boundary plane; and
   (b) bonding an additional block of transparent material to said stack at said boundary plane to form said precursor structure, and wherein said slicing is performed so that each slice additionally contains a part of said additional block.

13. An intermediate work product sliceable along a plurality of parallel planes to form a plurality of light-guide optical elements (LOEs) each having a pair of mutually-parallel major external surfaces for guiding image illumination propagating within the LOE by internal reflection at the major external surfaces, each LOE further having an active region comprising a set of mutually-parallel partially-reflecting surfaces located between, and oriented non-parallel to, the major external surfaces, and at least one secondary region, at least one of said partially-reflecting surfaces terminating at a boundary between the active region and the secondary region, the intermediate work product comprising:
   (a) a stack formed from a plurality of parallel-faced plates bonded together at a plurality of interfaces, one face at each of said interfaces having a coating to provide partially-reflecting optical properties, said stack being cut and polished at a boundary plane intersecting at least one of said interfaces; and (b) a block of transparent material bonded to said stack at said boundary plane, and wherein said block of transparent material is index-matched to said plurality of plates.

14. An intermediate work product sliceable along a plurality of parallel planes to form a plurality of light-guide optical elements (LOEs) each having a pair of mutually-parallel major external surfaces for guiding image illumination propagating within the LOE by internal reflection at the major external surfaces, each LOE further having an active region comprising a set of mutually-parallel partially-reflecting surfaces located between, and oriented non-parallel to, the major external surfaces, and at least one secondary region, at least one of said partially-reflecting surfaces terminating at a boundary between the active region and the secondary region, the intermediate work product comprising:

(a) a stack formed from a plurality of parallel-faced plates bonded together at a plurality of interfaces, one face at each of said interfaces having a coating to provide partially-reflecting optical properties, said stack being cut and polished at a boundary plane intersecting at least one of said interfaces; and (b) a block of transparent material bonded to said stack at said boundary plane, and wherein said coatings are configured to provide sequentially varying reflectivity for successive of said interfaces.

15. An intermediate work product sliceable along a plurality of parallel planes to form a plurality of light-guide optical elements (LOEs) each having a pair of mutually-parallel major external surfaces for guiding image illumination propagating within the LOE by internal reflection at the major external surfaces, each LOE further having an active region comprising a set of mutually-parallel partially-reflecting surfaces located between, and oriented non-parallel to, the major external surfaces, and at least one secondary region, at least one of said partially-reflecting surfaces terminating at a boundary between the active region and the secondary region, the intermediate work product comprising:

(a) a stack formed from a plurality of parallel-faced plates bonded together at a plurality of interfaces, one face at each of said interfaces having a coating to provide partially-reflecting optical properties, said stack being cut and polished at a boundary plane intersecting at least one of said interfaces; and (b) a block of transparent material bonded to said stack at said boundary plane, and wherein said plates have thicknesses differing from each other such that said interfaces are non-uniformly spaced.

* * * * *